United States Patent [19]
Taylor et al.

[11] 4,196,799
[45] Apr. 8, 1980

[54] SAFETY DECOUPLER

[75] Inventors: Gary R. Taylor, Mesa; Harry A. Elliott, Phoenix, both of Ariz.

[73] Assignee: The Garrett Corporation, Los Angeles, Calif.

[21] Appl. No.: 862,076

[22] Filed: Jan. 10, 1978

[51] Int. Cl.² ............ F16D 43/20; F16D 13/74; F02N 15/06; F16D 45/00
[52] U.S. Cl. .................. 192/48.6; 74/6; 192/41 A; 192/113 B; 192/56 R
[58] Field of Search ............ 192/56 R, 48.6, 41 A, 192/45, 113 B; 74/6, 7 R, 7 A

[56] References Cited
U.S. PATENT DOCUMENTS

| 2,942,480 | 6/1960 | Schindel | 192/56 R X |
| 2,942,481 | 6/1960 | Gilbert | 192/56 R X |
| 3,175,661 | 3/1965 | Maurer et al. | 192/113 B X |
| 3,224,542 | 12/1965 | Zlotek | 192/113 B |
| 3,269,498 | 8/1966 | Hoenig et al. | 192/56 R |
| 3,536,174 | 10/1970 | Vance | 192/56 R |

FOREIGN PATENT DOCUMENTS 1303816  1/1973  United Kingdom ............... 192/113 B Primary Examiner—Allan D. Herrmann
Attorney, Agent, or Firm—James W. McFarland; Albert J. Miller

[57] ABSTRACT

A starter decoupler automatically responsive to occurrence of failure of an overrunning clutch to decouple the clutch from an output shaft to prevent overspeed of the starter.

20 Claims, 6 Drawing Figures

SAFETY DECOUPLER

BACKGROUND OF THE INVENTION

This invention relates to safety decouplers and more particularly relates to such a decoupler capable of automatically disengaging an overrunning clutch from an output shaft to avoid excessive overspeeding of the clutch through driving thereof from the output shaft in the event of failure.

Overrunning clutches are normally utilized between a starter mechanism and the drive shaft of a prime mover engine. Normally the overrunning clutch operates to deliver torque from the starter to the drive shaft for initiating rotation of the latter. Once the drive shaft speed exceeds that of the clutch, the output shaft can continue to accelerate without transmitting torque through the uni-directional clutch which would overspeed the starter. In certain instances of failure, for instance of the overrunning clutch, continued acceleration of the drive shaft can transmit torque reversely to overspeed the clutch and destroy the clutch and the starter mechanism associated therewith.

Various arrangements of prior art clutching mechanisms and/or safety devices therefor may be found in the following U.S. Pat. Nos: 2,710,763; 2,744,396; 2,942,480; 2,942,481; 2,964,931; 3,136,400; 3,153,334; and 4,061,216.

SUMMARY OF THE INVENTION

It is an important object of the invention to provide an improved decoupling method and apparatus for an overrunning clutch and/or starter arrangement as above described which is automatically operable to decouple the overrunning clutch from the output drive shaft in the event of failure within the system.

More particularly, it is an important object of the present invention to provide an improved mechanism of the class described in the preceding object which is of simple, economical and reliable construction by inclusion of a biasing means normally allowing torque transmittal between the clutch and the output shaft, but which is responsive to transmittal of excessive reverse torque from the output shaft to decouple the latter from the clutch.

A more particular object of importance with the preceding object is to provide a torsion bar which is radially twisted to create the biasing force.

Another object of the invention is to provide decoupler of the class described having an economical integral pumping mechanism for lubrication fluid flow.

In summary, the invention contemplates a starter system with an overrunning clutch having an inner race which transmits torque through a first spline connection to an intermediate shaft. One end of the intermediate shaft has cam surfaces thereon to present an open face end jaw shaft which is engageable with a cross pin carried by the output or drive shaft. A torsion bar concentrically arranged within the intermediate shaft has one end splined to the intermediate shaft and an opposite end secured to the cross pin of the output shaft such that the torsion shaft is twisted along its length to exert a torsion force on the cross pin urging the latter toward a circular portion of the cam surfaces on the jaw. Starting torque is then delivered through the intermediate shaft to the cross pin to drive the output shaft. Once output shaft speed exceeds that of the race of the overrunning clutch, the cross pin rides upwardly on a ramp portion of the cam surface, and in normal operation remains there transmitting sufficient reverse torque to rotate the intermediate shaft and the inner race of the overrunning clutch at the same speed as the output shaft. In the event of failure such as in the overrunning clutch which would result in driving of the input shaft of the clutch and possibly the starter mechanism along with the inner race, the excessive reverse torque transmitted from the output shaft in attempting to drive the intermediate shaft causes the cross pin thereof to slide further along the ramp portion of the cam surface. This excessive torque is thus transformed into a thrust load forcing the intermediate shaft longitudinally a sufficient distance to disengage the cam surfaces from the cross pin, and to disengage the spline connection of the intermediate shaft with the torsion shaft.

These and other more particular objects and advantages of the present invention are specifically set forth in or will become apparent from the following detailed description of a preferred embodiment of the invention when read in conjunction with the accompanying drawing.

DETAILED DESCRIPTION OF THE PREFERRED EMBODIMENT

Figure 1:
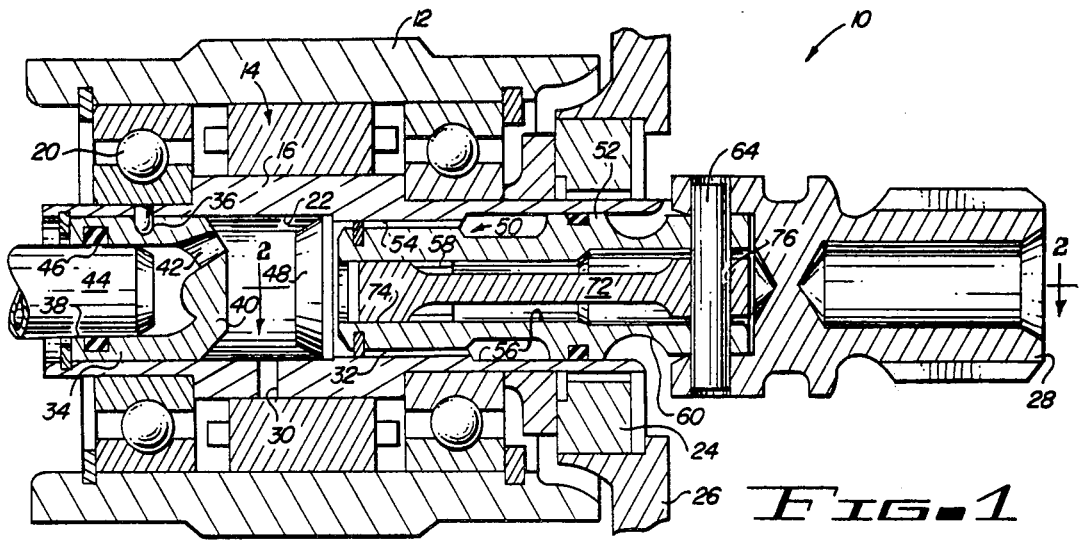
FIG. 1 is an elevational cross-sectional view, partially in schematic form, illustrating apparatus constructed in accordance with the principles of the present invention.

Referring now more particularly to the drawings, a decoupler mechanism generally denoted by the numeral 10 is shown in conjunction with a portion of a schematically illustrated conventional starter arrangement which includes a power input element 12 normally driven by the starter arrangement. Through a conventional, uni-directional, overrunning type of clutch such as a sprag clutch 14, input starting torque is transmitted to rotate an inner race 16 of the sprag clutch in a specified direction of rotation, for instance in a direction illustrated by arrow 18 of FIG. 2. Appropriate overrunning bearings 20 are disposed between the input element 12 and inner race 16 of the sprag clutch.

Inner race 16 is of generally longitudinally elongated, cylindrical configuration with a central through opening 22 therein. An outer end of the intermediate race 16 extends outwardly of a carbon face seal 24 and associated housing structure 26 to be located adjacent to a second output or drive shaft 28. Inner race 16 further includes one or more radially extending fluid supply and lubrication ports 30 extending between central opening 22 and the sprag clutch 14 for delivering lubricating fluid flow to the latter. Intermediate its ends the inner race 16 further has a female spline portion 32 configured on the interior wall of central opening 22.

Figure 5:
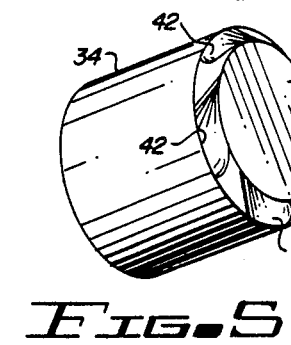
FIG. 5 is a perspective illustration of the discharge end of the slinger pump.
Figure 6:
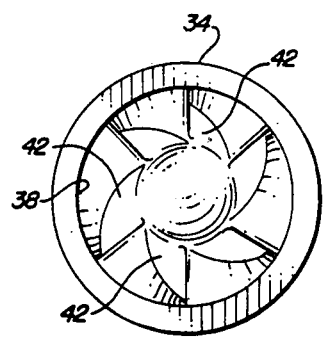
FIG. 6 is an elevational view of the inlet end of the slinger pump.

At the opposite end of inner race 16 is disposed a slinger pump in the form of a unitary cylindrical body 34 secured such as by a pin 36 for rotation with inner race 16. As shown in FIGS. 1, 5 and 6, the pump 34 has an open end defining a fluid inlet port 38, and an opposite end of the body 34 disposed within central opening 22 has an end wall 40 substantially closing the pump from central opening 22. Extending from the interior body 34 through wall 40 are a plurality of circumferentially curved, radially extending discharge ports 42 for slinging or discharging lubricating fluid from the inlet port of the pump into central opening 22. A lubricating fluid inlet oil supply line 44 opens into inlet port 38 and is mounted in non-rotating relationship relative to body 34 through a schematically depicted, sealing type bearing arrangement 46. Preferably, an oil deflector 48 extends across central opening 22 to assist in directing fluid lubricating flow through supply port 30 to the sprag clutch 14.

Carried within central opening 22 is a generally longitudinally elongated, cylindrically configured, longitudinally shiftable intermediate shaft 50 having an enlarged diametral portion 52 slidable against the inner wall of the central opening 22. Adjacent its inner end, the intermediate shaft 52 has a male spline portion 54 configured thereon for driving interengagement with the female spline 32 on inner race 16. The intermediate shaft further includes a longitudinal central through bore 56 and also has a female spline portion 58 configured on the inner wall of the central bore 56 adjacent its inner end. Shaft 50 further includes a reduced diameter shear section 60.

Output shaft 28 includes a central recessed section 62 and a cross pin 64 affixed to shaft 28 and traversing central recess 62. Intermediate shaft 50 is arranged with its outer end disposed within central recess 62. This outer end of intermediate shaft has an open jaw configuration thereon comprising a pair of diametrically opposed, identical, mirror image cam surfaces 66. Each cam surface 66 includes a radially extending circular section 68 and a ramp portion 70. Ramp portion 70 is preferably gently helically curved toward the outer end of the intermediate shaft in a longitudinal direction. The intermediate shaft is so disposed such that the cross pin 64 of the output shaft normally is in torque transmitting engagement with cam surfaces 66.

Mounted for longitudinal shifting within central bore 56 of intermediate shaft 50 is an elongated torsion shaft 72 having a male spline portion 74 configured at the inner end thereof for torque transmitting interengagement with the female spline 58 on the inner surface of central bore 56. The outer end of shaft 72 is disposed generally within central recess 62 of the output shaft and includes a cross bore 76 through which is received the cross pin 64 such that the torsion shaft 72 is secured to the output shaft 28.

During assembly, torsion shaft 72 is circumferentially twisted by holding shaft 28 rigidly against rotation while the spline portion 74 of the torsion shaft is slid into the corresponding spline portion 58 in offset relationship relative to the outer end of the torsion shaft. More particularly, the torsion shaft is so assembled in order to produce a preselected amount of torsional biasing force which, upon release of shaft 28, urges the shaft to rotate in a direction forcing the cross pin 64 into the circular section 68 of the cam surfaces.

Figure 2:
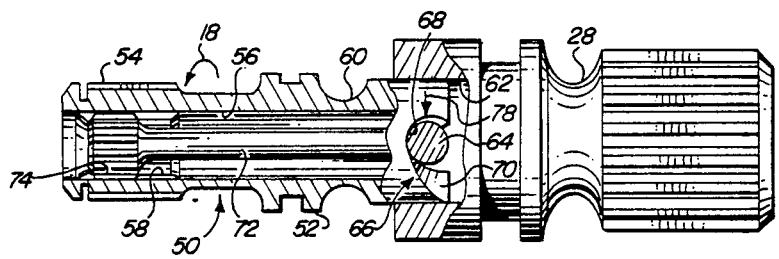
FIG. 2 is a partially cross-sectional elevational view of a portion of the components of the decoupling mechanism, as viewed generally along lines 2—2 of FIG. 1.

In operation, starting torque for accelerating output shaft 28 is delivered from the starter mechanism when the decoupler is in its FIG. 2 disposition. As noted previously the assembly of the torsion shaft 72 exerts a biasing force holding the cross pin 64 onto the circular section 68 of the cam surfaces. Starting torque delivered from the starter mechanism through the input portion 12 and the sprag clutch 14 causes rotation of inner race 16 in the direction illustrated by arrow 18 of FIG. 2. As noted by arrow 78 this starting torque is transmitted directly from the circular section 68 of the cam surfaces to effect corresponding directional rotation of output shaft 28. It will thus be apparent that starting torque is delivered from a first shaft such as inner race 16 through a first spline shaft 50, the starting torque then subsequently being transmitted through the circular portion of cam surfaces 66 to the output shaft 28.

Figure 3:
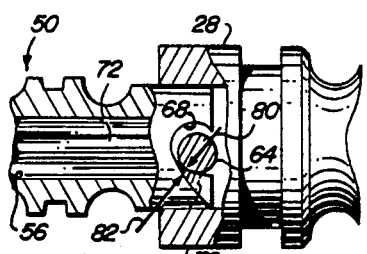
FIG. 3 is a partial view similar to FIG. 2 but showing the relationship of the components during normal operation.

In normal operation, the driving mechanism will continue to accelerate shaft 28 to a speed substantially greater than that produced by the starting mechanism. Accordingly, reverse torque is then transmitted from the output shaft tending to drive the intermediate shaft at the speed of output shaft 28. As a result, the cross pin 64 rides slightly outwardly along ramp portions 70 of the cam surfaces such that the reverse torque from output shaft 28 as depicted by arrow 80 is transmitted back through the ramp portion 70 to drive intermediate shaft 50 and inner race 16 at the same speed as output shaft 28. The torsional biasing force exerted by the twisted torsion shaft 72 produces a counteracting force illustrated by arrow 82 in FIG. 3 which maintains the cross pin in torque transmitting relationship with the ramp portions 70. Thus, during normal operation of output shaft 28 at a speed substantially greater than that produced by the starter mechanism, the intermediate shaft 50 and inner race 14 rotate at the same speed as output shaft 28. The uni-directional action of the conventional sprag clutch 14 of course prevents transmittal of this reverse torque to the input portion 12 thereof to protect the starter mechanism. In this connection, the torsional preload presented by shaft 72 is so preselected such that the biasing force thereof is of sufficient magnitude to permit a preselected maximum amount of reverse torque to be transmitted from the output shaft 28 to the intermediate shaft 50. More particularly, this maximum torque permitted to be transmitted from output shaft 28 to the intermediate shaft 50 is sufficient to drive the intermediate shaft and the inner race 14, but not the sprag clutch 14, input 12 and starter mechanism.

Figure 4:
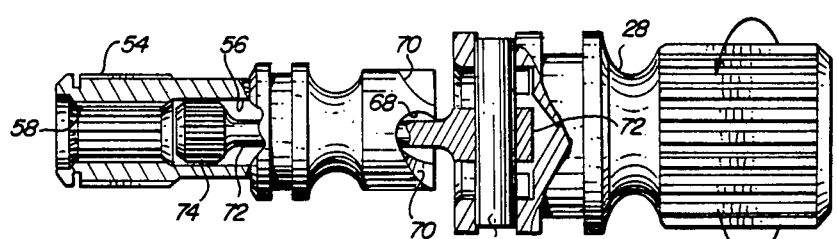
FIG. 4 is a partially cross-sectional plan view of the apparatus of FIG. 3 but showing the elements in their decoupled state.

In the event of failure in the system, such as a failure of sprag clutch 14 resulting in a transmittal of reverse torque through the sprag clutch attempting to drive the input member 12 thereof at the same speed as the output shaft 28, it will be apparent that substantially greater reverse torque must be transmitted from the output shaft through cross pin 64 and ramp portion 70. However, the torsion shaft is so preloaded such that in the instance of such a failure, the increase reverse torque attempting to be transmitted through ramp portion 70 exerts a force overcoming the biasing force created by torsion shaft 72. As a result, the reverse torque being transmitted from output shaft 28 as depicted by arrow 80 in FIG. 3 exceeds the force developed by torsion shaft 72, and this excessive reverse torque from output shaft 28 then forces cross pin 64 to begin moving upon ramp portion 70 exerting a longitudinal thrust on intermediate shaft 50. Thus this excessive reverse torque from the output shaft develops or is transformed into a longitudinal thrust force shifting intermediate shaft 50 leftwardly with respect to FIGS. 1 and 4 and forcing the cam surfaces 66 out of driving engagement with pin 64. In this manner the output shaft 28 is decoupled from intermediate shaft 50 which is shifted to its FIG. 4 disposition. This longitudinal shifting of intermediate shaft 50 continues sufficiently to break the torque transmitting interengagement of the spline connection between splines 58 and 74. Accordingly, torsion shaft 72 becomes disengaged from intermediate shaft 50 to completely disengage the cross pin 64 of the output shaft from torque transmitting engagement with the intermediate shaft 50. As necessary, of course, the oil deflector 48 is arranged to shift leftwardly as necessary with leftward movement of shaft 50.

In the event of malfunction causing transmittal of excessive torque from the starter mechanism toward output shaft 28, the shear section 60 in intermediate shaft 50 will break. Also, such excessive torque from the starter mechanism with tend to further twist and ultimately break torsion rod 72. In this manner output shaft 28 and the gearbox and other devices associated therewith are protected from the excessive torque caused by the malfunction.

The present invention provides improved method and apparatus which automatically decouples the output shaft from the inner race 16 in the instance of excessive reverse torque transmittal from the output shaft attempting to overspeed the inner race 16. This is accomplished through utilization of the torsion shaft 72 preassembled to present a preload biasing force holding the cross pin 64 in torque transmitting engagement with either the circular section 66 or ramp portion 70 of the cam surfaces. It will be further apparent that the splined engagement of the torsion shaft with the intermediate shaft produces the necessary torque for twisting the torsion shaft and creating the biasing force or preload exerted thereby upon cross pin 64. From the foregoing it will also be apparent that the present invention provides an improved method of decoupling a first shaft in the form of inner race 16 from a second shaft 28 by the steps of transmitting torque from race 16 to the intermediate shaft 50 through a first spline connection; then transmitting torque from intermediate shaft 50 to the output shaft 28 through cam surfaces 66; and exerting a biasing force between intermediate shaft 50 and shaft 28 so as to maintain the cam surfaces and output shaft and torque transmitting engagement, the biasing force determining a preselected maximum torque capable of being transmitted from the output shaft to the intermediate shaft; and automatically decoupling the intermediate shaft 50 from output shaft 28 in response to longitudinal shifting of the intermediate shaft in the event of transmittal of torque from the output shaft toward the input shaft which is greater than the preselected maximum reverse torque permitted to be transmitted by the biasing force created by the torsion shaft.

The foregoing detailed description of a preferred embodiment of the present invention is to be considered exemplary in nature and not as limiting to the scope and spirit of the invention as set forth in the appended claims.

Having described the invention with sufficient clarity that those skilled in the art may make and use it, we claim:

1. A decoupler for decoupling an overrunning clutch from an output shaft in the event of failure of the clutch, comprising:

a longitudinally shiftable intermediate shaft driven by said clutch and having a cam surface thereon engageable with said output shaft; and a torsion bar having one end in splined engagement with said intermediate shaft and an opposite end secured to said output shaft, said torsion bar being normally twisted to exert a pre-load between said cam surface and said output shaft for transmittal of torque therebetween, said cam surface configured and arranged whereby upon failure of said clutch said intermediate shaft shifts longitudinally out of engagement with said output shaft and said torsion bar.

2. A decoupler as set forth in claim 1, wherein said cam surface is disposed at an outer end of said intermediate shaft and includes a radially extending circular portion and a longitudinally curved ramp portion.

3. A decoupler as set forth in claim 2, wherein said ramp portion is helically curved toward said outer end of the intermediate shaft.

4. A decoupler as set forth in claim 2, wherein said output shaft is normally in torque transmitting engagement with said circular portion for transmitting torque from said intermediate shaft to said output shaft, and said output shaft is in torque transmitting engagement with said ramp portion for transmittal of torque from said output shaft to said intermediate shaft.

5. A decoupler as set forth in claim 4, wherein said output shaft includes a cross pin carried at one end of said output shaft, said cross pin engageable with said circular and ramp portions of the cam surface, said torsion bar having a cross bore at one end thereof for receiving said cross pin for securement of said torsion bar to said output shaft.

6. A decoupler as set forth in claim 5, wherein said intermediate shaft comprises a pair of identical cam surfaces diametrically opposed at one end of said intermediate shaft.

7. A decoupler as set forth in claim 1, wherein said overrunning clutch includes an inner race having a longitudinally extending central opening with a female spline configured on the wall of said central opening, said intermediate shaft having a corresponding male spline configured on the outer surface thereof normally in torque transmitting engagement with said female spline, said intermediate shaft longitudinally shiftably mounted within said central opening of said inner race.

8. A decoupler as set forth in claim 7, wherein said intermediate shaft has a central bore therein and a second female spline configured on the wall of said central bore, said torsion bar disposed within said central bore and having a second male spline configured at one end thereof for torque transmitting engagement with said second female spline.

9. A decoupler as set forth in claim 8, wherein said cam surface is disposed at an outer end of said intermediate shaft and includes a radially extending circular portion and a longitudinally curved ramp portion.

10. A decoupler as set forth in claim 9, wherein said output shaft is normally in torque transmitting engagement with said circular portion for transmitting torque from said intermediate shaft to said output shaft, and said output shaft is in torque transmitting engagement with said ramp portion for transmittal of torque from said output shaft to said intermediate shaft.

11. A decoupler as set forth in claim 10, wherein said output shaft includes a cross pin carried at one end of said output shaft, said cross pin engageable with said circular and ramp portions of the cam surface, said torsion bar having a cross bore at one end thereof for receiving said cross pin for securement of said torsion bar to said output shaft.

12. A decoupler as set forth in claim 11, wherein said torsion bar is circumferentially twisted between said second male spline and said cross bore thereof to exert a torsional pre-load force on said cross pin urging the latter toward said circular portion of the cam surface.

13. A decoupler as set forth in claim 7, further including a slinger pump mounted within one of said central opening and secured for rotation with said inner race, said pump including a cylindrical body having a wall substantially closing one end and an opposite end defining a fluid inlet port, said wall having a plurality of circumferentially curved, radially extending discharge ports for discharging lubricating fluid into said central opening of the inner race.

14. A decoupler as set forth in claim 13, said inner face having a radial fluid supply port extending therethrough for supplying lubricating fluid from said central opening to said clutch, and further including a fluid deflector plug carried in said central opening for directing lubricating fluid in said central opening toward said radial supply port for delivery to said clutch.

15. In combination:
an overrunning clutch having an output power inner race, said inner race having a longitudinally extending central opening with a first female spline configured on the wall of said central opening, said inner race including a radial fluid supply port extending therethrough; and
a slinger pump mounted within one end of said central opening and secured for rotation with said inner race, said pump comprising a unitary cylindrical body having a wall substantially closing one end and an opposite open end defining a fluid inlet port, said wall having a plurality of circumferentially curved, radially extending discharge ports for discharging lubricating fluid into said central opening of the inner race.

16. A combination as set forth in claim 15, further including a fluid deflector plug carried in said central opening for directing lubricating fluid in said central opening toward said radial supply port for delivery to said clutch.

17. In combination:
an overrunning clutch having an output power inner race, said inner race having a longitudinally extending central opening with a first female spline configured on the wall of said central opening, said inner race including a radial fluid supply port extending therethrough;
a slinger pump mounted within one end of said central opening and secured for rotation with said inner race, said pump including a cylindrical body having a wall substantially closing one end and an opposite open end defining a fluid inlet port, said wall having a plurality of circumferentially curved, radially extending discharge ports for discharging lubricating fluid into said central opening of the inner race;
a fluid deflector plug carried in said central opening for directing lubricating fluid in said central opening toward said radial supply port for delivery to said clutch;
an intermediate shaft carried in said central opening for longitudinal movement therein, said intermediate shaft having a central bore open at an outer end of said intermediate shaft disposed exteriorly of said central opening, said intermediate shaft having a first male spline configured on the outer surface adjacent its opposite end and normally disposed in torque transmitting engagement with said first female spline, said intermediate shaft further having a second female spline configured on the inner surface of said central bore adjacent said opposite end, said intermediate shaft further having a pair of diametrically disposed cam surfaces at said outer end, each of said cam surfaces including a radially extending circular portion and a longitudinally curved ramp portion;
a power output shaft disposed adjacent said outer end of the intermediate shaft;
a cross pin carried by said output shaft normally in engagement with said circular portions of the cam surfaces for torque transmittal from said inner race and intermediate shaft to said output shaft, and normally in engagement with said ramp portions of the cam surfaces for torque transmittal from said output shaft to said intermediate shaft and inner race; and
a longitudinally elongated torsion bar disposed in said central bore of the intermediate shaft, said torsion bar having a second male spline configured at an inner end thereof for torque transmitting engagement with said second female spline, said torsion bar having a cross bore at an outer end thereof receiving said cross pin, said torsion bar being circumferentially twisted between its inner and outer ends whereby torque transmitted from said second female to said second male spline exerts a torsion preload urging said cross pin toward said circular portions of the cam surfaces,
said cam surfaces configured and arranged whereby transmittal of torque above a preselected value from said cross pin to said ramp portions shifts said intermediate shaft longitudinally to disengage said cam surfaces from said cross pin and to disengage said second male and female splines.

18. A decoupler for decoupling first and second shafts from torque transmitting engagement, comprising:
an intermediate shaft in splined engagement with said first shaft for torque transmittal therebetween, said intermediate shaft having a cam surface thereon normally in torque transmitting engagement with said second shaft; and
means for exerting a biasing force between said intermediate shaft and said second shaft for maintaining said cam surface and said second shaft in torque transmitting engagement, said biasing means arranged whereby whenever the force of torque transmitted from said second shaft to said cam surface exceeds said biasing force, said intermediate shaft is shifted longitudinally to disengage said cam surface from said second shaft and decouple said first and second shafts,
said second shaft including a pin secured to said biasing means and engageable with said cam surface, said biasing means disengageable from said intermediate shaft upon said shifting of the latter.

19. A method of decoupling first and second shafts from driving interengagement, comprising the steps of:
trasmitting torque between the first shaft and an intermediate shaft through a spline connection;

transmitting torque between the intermediate shaft and the second shaft through a cam surface on the intermediate shaft;

exerting a biasing force between the intermediate shaft and the second shaft to normally maintain the cam surface and the second shaft in torque transmitting engagement, said biasing force determining a preselected maximum torque capable of being transmitted from the second shaft to the intermediate shaft, said exerting step including twisting a torsion bar extending between said intermediate and said second shafts, and transmitting torque between said intermediate shaft and said torsion bar through another spline connection to normally maintain said torsion bar in its twisted condition;

decoupling the intermediate shaft form the second shaft by shifting the intermediate shaft longitudinally to disengage the cam surface thereof from the second shaft in response to transmittal of torque greater than said preselected maximum torque, from the second shaft to the intermediate shaft; and removing said biasing force by disengaging said another spline connection upon longitudinal shifting of said intermediate shaft.

20. A method as set forth in claim 1, wherein said decoupling step includes utilizing torque transmitted from said second shaft to said cam surface beyond said maximum torque permitted by said biasing force, to effect said longitudinal shifting of the intermediate shaft.

* * * * *